United States Patent
Chien et al.

(10) Patent No.: US 10,302,197 B2
(45) Date of Patent: May 28, 2019

(54) GRAPHITE CAST IRON NITRIDED PISTON RING

(71) Applicant: JAPON TRAFFIC TECH CORP., Taichung (TW)

(72) Inventors: Wan Tzu Chien, Taichung (TW); Wei Te Wu, Taichung (TW); Chen Yu Chien, Taichung (TW); Chia Chun Li, Taichung (TW)

(73) Assignee: JAPON TRAFFIC TECH CORP., Taichung (TW)

( * ) Notice: Subject to any disclaimer, the term of this patent is extended or adjusted under 35 U.S.C. 154(b) by 13 days.

(21) Appl. No.: 15/688,175

(22) Filed: Aug. 28, 2017

(65) Prior Publication Data
US 2018/0058582 A1 Mar. 1, 2018

(30) Foreign Application Priority Data
Aug. 29, 2016 (TW) .............................. 105213156 U

(51) Int. Cl.
*F16J 9/26* (2006.01)
*C23C 8/26* (2006.01)

(52) U.S. Cl.
CPC .. *F16J 9/26* (2013.01); *C23C 8/26* (2013.01)

(58) Field of Classification Search
CPC ..................................... F16J 9/26; C23C 8/26
See application file for complete search history.

(56) References Cited

U.S. PATENT DOCUMENTS

| | | | | |
|---|---|---|---|---|
| 5,154,433 | A * | 10/1992 | Naruse | F16J 9/26 277/443 |
| 6,139,022 | A * | 10/2000 | Iwashita | C23C 16/26 277/442 |
| 6,325,385 | B1 * | 12/2001 | Iwashita | F16J 9/26 277/442 |
| 7,024,982 | B2 * | 4/2006 | Aizawa | F16J 9/22 277/442 |
| 2006/0006606 | A1 * | 1/2006 | Smith | E21B 10/25 277/500 |
| 2013/0043659 | A1 * | 2/2013 | Ito | F16J 9/20 277/443 |

* cited by examiner

*Primary Examiner* — Gilbert Y Lee
(74) *Attorney, Agent, or Firm* — Muncy, Geissler, Olds & Lowe, P.C.

(57) ABSTRACT

A graphite cast iron nitrided piston ring has a main body including matrix and a nitrided layer. The matrix is made of graphite cast iron, and the nitrided layer is formed by subjecting a surface of the matrix to contact a cylinder to a gas nitriding process. With the nitrided layer formed at the surface of the matrix made of graphite cast iron, the piston ring has sufficient hardness and good abrasion resistance.

6 Claims, 5 Drawing Sheets

GRAPHITE CAST IRON NITRIDED PISTON RING

BACKGROUND OF THE INVENTION

1. Technical Field

The present invention relates to piston rings, and more particularly to a piston ring that is made of graphite cast iron and gets nitride at its surface.

2. Description of Related Art

Given that a piston ring is to be mounted around a piston in an engine to ensure airtightness when the piston moves to and fro in a cylinder, it has to possess good resistance to abrasion and heat and have proper hardness, so as to not scratch cylinder wall, reduce engine power, consume fuel excessively and increase noise.

A conventional piston ring for engines is made of alloy steel and plated with chromium (hexavalent chromium) or nitrided at its surface, for enhancing hardness at alloy steel's skin layer thereby improving service life of the piston ring. However, alloy steel as a material is in nature less resistant to heat, and the piston ring after nitrided or plated with chromium has its surface too hard to run smoothly in the cylinder. This is adverse to the cylinder's service life and operational efficiency, particularly serious to ceramic cylinders. In addition, as a surface treatment process, electroplating with chromium can generate waste water containing a high concentration of heavy metal. This not only requires relatively high costs for waste water treatment, but also diverges from the tendency toward environmental protection. For these reasons, electroplating is expected to be eventually removed from the production process of piston rings.

Another conventional piston ring is made of alloy through a nitriding process so that a nitrided layer is formed at the surface of its alloy matrix. Such a piston ring has high hardness, high abrasion resistance, and high corrosion resistance. However, the special alloy for making its matrix is expensive and matrix, and the ion reaction equipment for the nitriding process is also costly.

The so-called graphite cast iron is a kind of cast iron, and includes spherical graphite cast iron (hereinafter referred to as ductile graphite cast iron) and flake graphite cast iron. Ductile graphite cast iron is processed by spheroidization and inoculation into spherical graphite. If graphite cast iron is used as the matrix of a piston ring, the resulting piston ring tends to degrade in performance because graphite cast iron is relatively weak in hardness and abrasion resistance. Even if it is nitride, graphite cast iron is likely to deform substantively. Therefore, graphite cast iron is not a conventional material for piston rings.

BRIEF SUMMARY OF THE INVENTION

One objective of the present invention is to address the foregoing problems by providing a graphite cast iron nitrided piston ring. The disclosed piston ring is made without chromium electroplated at its surface, so it saves the costs otherwise required by waste water treatment and is more environmentally friendly.

Another objective of the present invention is to provide the graphite cast iron nitrided piston ring wherein the piston ring takes ductile graphite cast iron as its matrix that has great oil scrapping effects itself, and the nitrided layer formed at the surface of the matrix through a nitriding process further increases hardness and abrasion resistance and provides sufficient fatigue resistance, making the piston ring cost-effective and environmentally friendly to manufacture For achieving the foregoing objectives, the disclosed graphite cast iron nitrided piston ring comprises a main body that has a matrix and a nitrided layer. The matrix is made of graphite cast iron, and the nitrided layer is formed by subjecting a surface of the matrix to contact a cylinder to a gas nitriding process.

Therein, the nitrided layer has a thickness not smaller than 7 microns, and the main body at its surface having the nitrided layer has a peak hardness ranging between 600 HV and 924 HV in Vickers hardness.

Therein, the main body has its hardness decreased gradually inward from the peak hardness at the surface having the nitrided layer.

Therein, the graphite cast iron is ductile graphite cast iron.

DETAILED DESCRIPTION OF THE INVENTION

FIG. 1 through FIG. 5 depict some illustrative embodiments of the present invention, and the scope of the present invention is not limited thereto.

Figure 1:
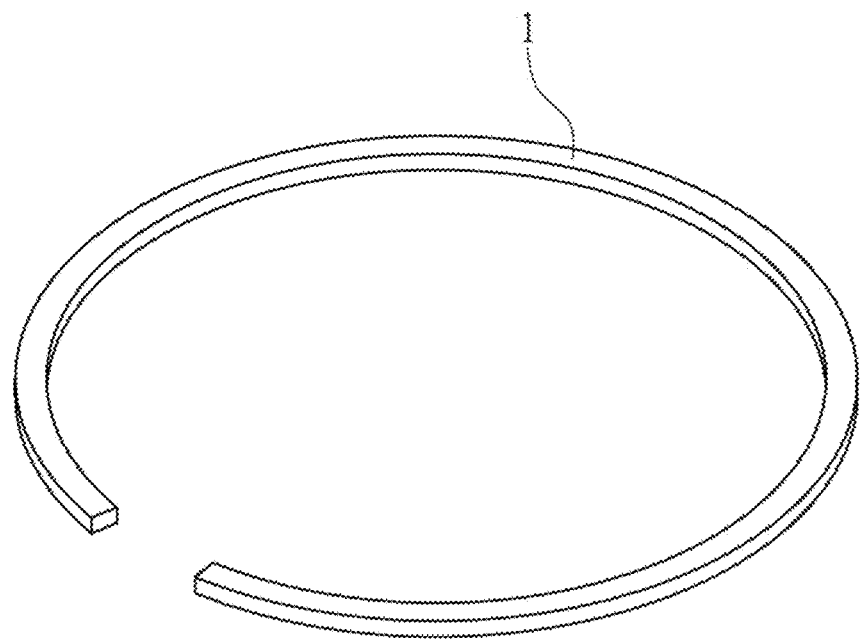
FIG. 1 is a perspective view of a main body of a piston ring according to one embodiment of the present invention.
Figure 2:
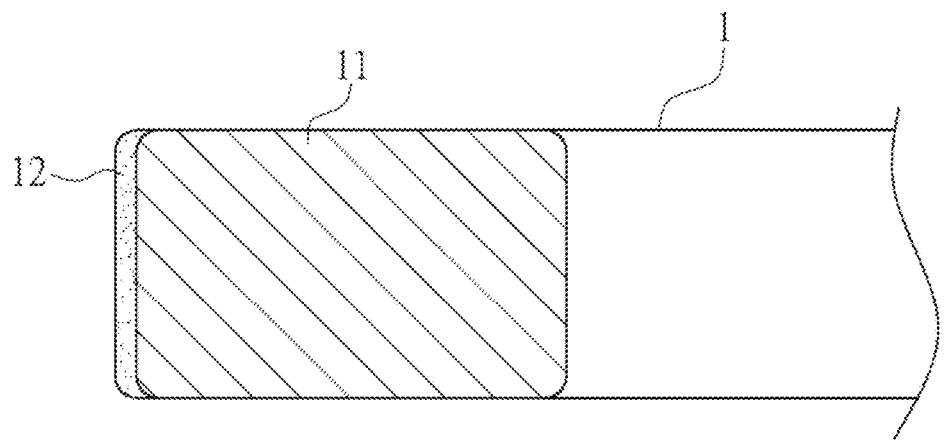
FIG. 2 is a partial, cross-sectional view of the main body of the piston ring that is made of ductile graphite cast iron and has a nitrided layer at the surface of its matrix.

The present embodiment provides a graphite cast iron nitrided piston ring, which is particularly suitable for working with ceramic cylinders. Referring to FIG. 1, the graphite cast iron nitrided piston ring has a main body 1. The main body 1 has a matrix 11 and a nitrided layer 12, as shown in FIG. 2. The matrix 11 is made of graphite cast iron. In the present embodiment, it is preferably made of ductile graphite cast iron. The nitrided layer 12 is made by treating the surface of the matrix 11 that is configured to contact the cylinder wall (not shown) through a gas nitriding process.

The nitrided layer 12 has its thickness not smaller than 7 microns. The main body 1 has a peak hardness at its surface formed with the nitrided layer 12. The peak hardness ranges between 600 HV and 924 HV in Vickers hardness. In the present embodiment, the main body 1 has its hardness decreased gradually from the surface having the nitrided layer 12 with the peak hardness inward.

Figure 3:
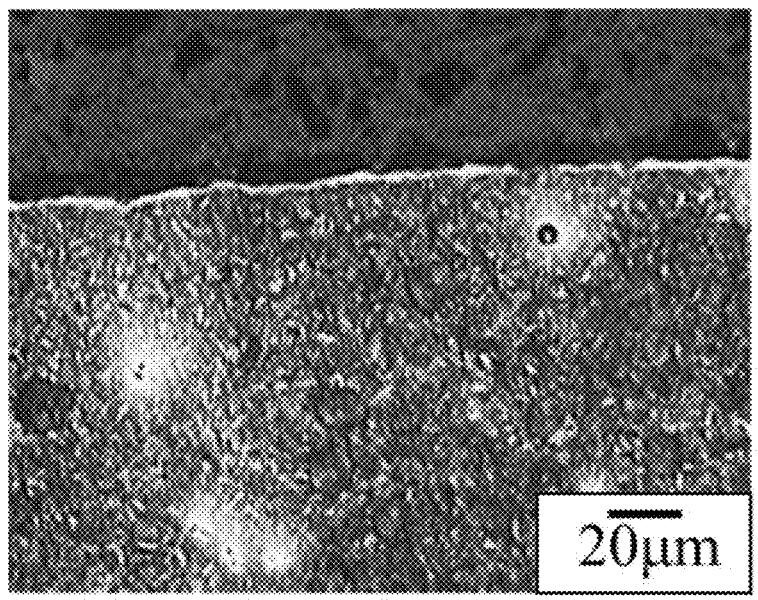
FIG. 3 is a metallograph of the main body of the piston ring after nitride according to one embodiment of the present invention.

FIG. 3 is a metallograph of the main body 1 after a nitriding process according to the present embodiment. The nitrided main body 1 was measured for hardness. As shown in Table 1, hardness measurement sessions were preformed from the depth of 0.01 mm from the skin layer of the main body 1 having the nitrided layer 12 inward. As measured, after nitrided, the peak hardness at the surface of the nitrided layer 12 was 600 HV in Vickers hardness, and the values measured at the depths of 0.01 mm, 0.03 mm, 0.05 mm, 0.1 mm, 0.15 mm, and 2.0 mm were 404 HV, 362 HV, 357 HV, 349 HV, 311 HV, and 305 HV in Vickers hardness, respectively. It is clear that the hardness decreased inward gradually from the peak value of 6001 HV as measured at the surface of the nitrided layer 12.

TABLE 1

Measured hardness values of the ductile graphite cast iron nitrided piston ring having a surface hardness of 600HV

| | Measured Depth | | | | | |
|---|---|---|---|---|---|---|
| | 0.01 mm | 0.03 mm | 0.05 mm | 0.1 mm | 0.15 mm | 0.2 mm |
| Hardness (HV) | 404 | 362 | 357 | 349 | 311 | 305 |

Figure 4:
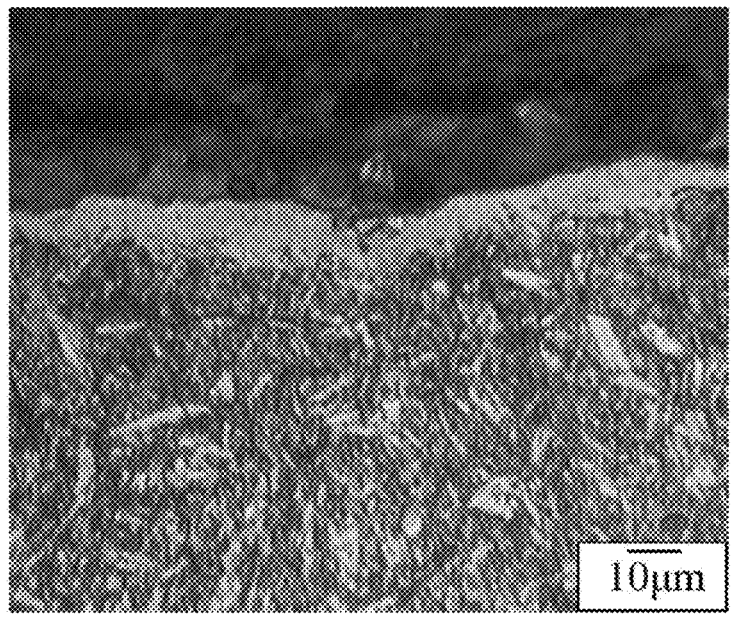
FIG. 4 is a metallograph of the main body of the piston ring after nitride according to another embodiment of the present invention.

FIG. 4 is a metallograph of the main body 1 after a nitriding process according to another embodiment. The nitrided main body 1 was measured for hardness. As shown in Table 2, hardness measurement sessions were preformed from the depth of 0.01 mm from the skin layer of the main body 1 having the nitrided layer 12 inward. As measured, after nitrided, the peak hardness at the surface of the nitrided layer 12 was 924 HV in Vickers hardness, and the values measured at the depths of 0.02 mm, 0.04 mm, 0.06 mm, 0.1 mm, 0.12 mm and 0.15 mm were 671 HV, 595 HV, 572 HV, 514 HV, 471 HV, and 477 HV in Vickers hardness, respectively. It is clear that the hardness decreased inward gradually from the peak value of 924 HV as measured at the surface of the nitrided layer 12.

TABLE 2

Measured hardness values of the ductile graphite cast iron nitrided piston ring having a surface hardness of 924HV

| | Measured Depth | | | | | |
|---|---|---|---|---|---|---|
| | 0.02 mm | 0.04 mm | 0.06 mm | 0.1 mm | 0.12 mm | 0.15 mm |
| Hardness (HV) | 671 | 595 | 572 | 514 | 471 | 477 |

Figure 5:
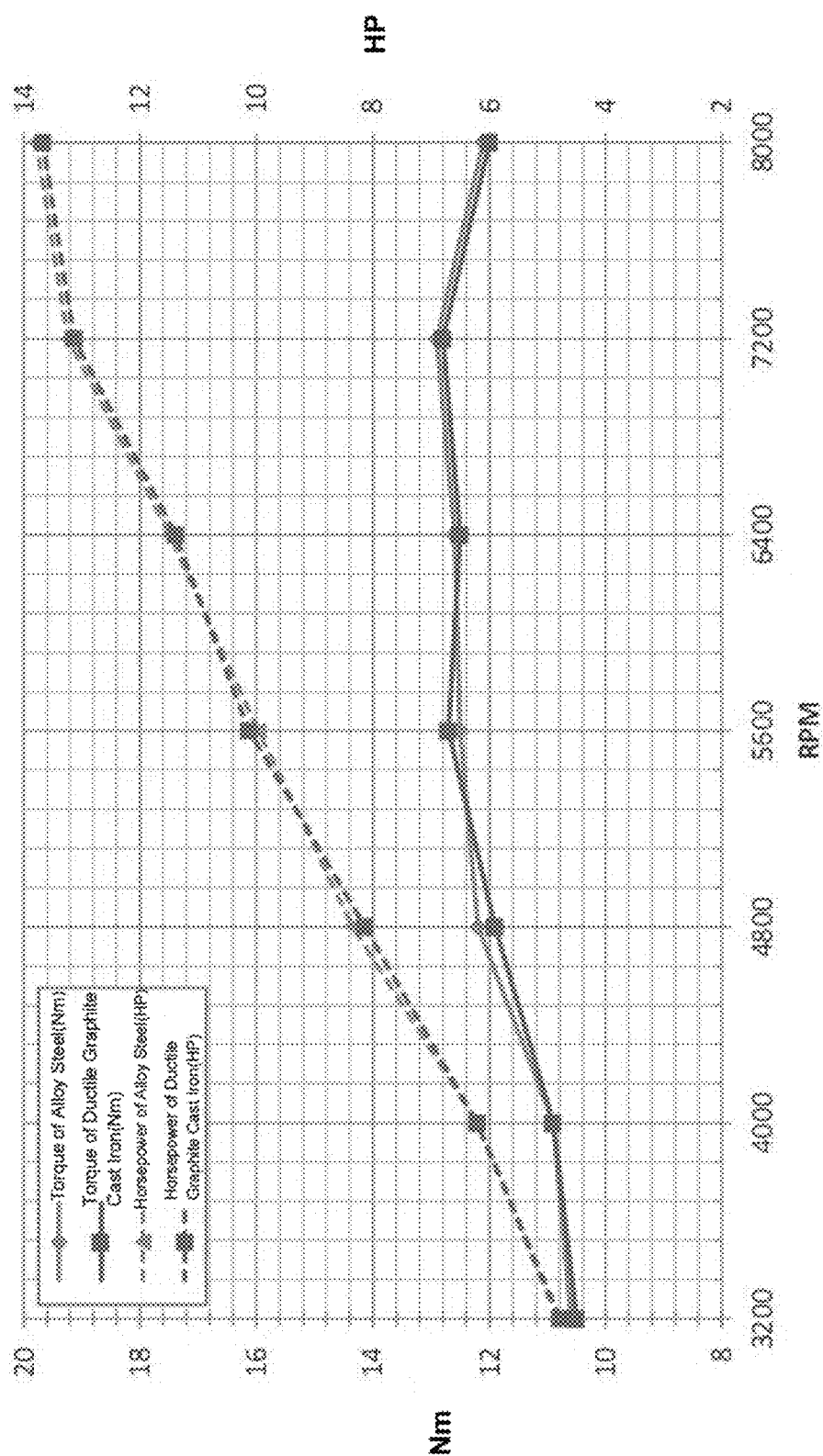
FIG. 5 is a curve graph showing performances of the disclosed piston ring and of a conventional piston ring in an engine test.

Vehicle tests were further conducted with a 150 CC vehicle. A conventional piston ring made of alloy steel and platted with chromium and a ductile graphite cast iron nitrided piston ring were tested for comparison. As shown in FIG. 5, the test range was between 3200 rpm and 8000 rpm in engine speed. It is clear that as the engine speed increased from 3200 rpm to 8000 rpm, the horsepower value increased from 10.5 HP to about 13.6 HP, and the torque value increased from 10.5 Nm to about 12.8 Nm. As graphed, in both the horsepower test and the torque test, the ductile graphite cast iron nitrided piston ring and the conventional alloy steel piston ring platted with chromium showed similar trends and results, both in the acceptable deviation range. Their test results in performance were also equal. It is thus demonstrated that the disclosed graphite cast iron nitrided piston ring is a competent substitute of the traditional alloy steel piston ring.

In use of the ductile graphite cast iron nitrided piston ring of the foregoing embodiment, where the peak hardness at the surface of the main body 1 is too high and needs to be reduced, since the main body 1 has its hardness gradually decreased inward from the surface of the nitrided layer 12, this can be simply done by grinding the nitrided layer 12 and removing the harder, outer part until the part having the proper hardness is exposed as the surface of the main body 1. Taking the main body 1 having the peak hardness of 924 HV at the nitrided layer 12 for example, where it is desired to reduce the hardness at the surface to 600 HV, a depth of 0.04 mm may be ground off from the surface, and the ground surface has its hardness of about 600 HV. In this way, surface hardness can be easily adjusted.

Through the foregoing description, the advantages of the present invention are clear:

1. With its matrix made of graphite cast iron and covered by a nitrided layer formed through a nitriding process, the disclosed graphite cast iron nitrided piston ring effectively overcomes the problems about insufficient surface hardness and abrasion resistance when graphite cast iron is used as the material of piston rings, and the nitrided piston ring can substitute the conventional alloy steel electroplated with chromium, so as to eliminated the shortcomings about electroplating such as environment pollution caused by waste water and high cost required by waste water treatment.

2. The piston ring has its matrix made of ductile graphite cast iron has good oil-scraping effects itself, and has a nitrided layer formed by nitriding the matrix at its surface, wherein the nitrided layer 12 at the surface of the main body 1 has a thickness not smaller than 7 μm, so that the surface hardness of the piston ring can be as high as HV600 to 924 HV in Vickers hardness. All these result in proper hardness, good abrasion resistance, and sufficient fatigue resistance, making the disclosed graphite cast iron nitrided piston ring suitable for working with commercially available engine cylinders, and particularly good for ceramic cylinders. In use, it helps to reduce the frequency of replacement of piston rings and to maintain the surface life of ceramic cylinders. Besides, its manufacturing cost is relatively low and is favorable to environmental protection.

What is claimed is:

1. A graphite cast iron nitrided piston ring, comprising a main body that has a matrix and a nitrided layer, wherein the matrix is made of graphite cast iron, the nitrided layer is formed by subjecting a surface of the matrix to contact a cylinder to a gas nitriding process, and the main body at its surface having the nitrided layer has a peak hardness ranging between 600 HV and 924 HV in Vickers hardness.

2. The graphite cast iron nitrided piston ring of claim 1, wherein the nitrided layer has a thickness not smaller than 7 microns.

3. The graphite cast iron nitrided piston ring of claim 2, wherein the main body has its hardness decreased gradually inward from the peak hardness at the surface having the nitrided layer.

4. The graphite cast iron nitrided piston ring of claim 3, wherein the graphite cast iron is ductile graphite cast iron.

5. The graphite cast iron nitrided piston ring of claim 2, wherein the graphite cast iron is ductile graphite cast iron.

6. The graphite cast iron nitrided piston ring of claim 1, wherein the graphite cast iron is ductile graphite cast iron.

* * * * *